(12) United States Patent
Fujita (10) Patent No.: US 8,753,248 B2
(45) Date of Patent: Jun. 17, 2014

(54) VEHICLE AND METHOD FOR CONTROLLING THE SAME

(75) Inventor: Hideyuki Fujita, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 214 days.

(21) Appl. No.: 13/518,399

(22) PCT Filed: Oct. 22, 2010

(86) PCT No.: PCT/JP2010/068677
§ 371 (c)(1),
(2), (4) Date: Jun. 22, 2012

(87) PCT Pub. No.: WO2011/077823
PCT Pub. Date: Jun. 30, 2011

(65) Prior Publication Data
US 2012/0264566 A1    Oct. 18, 2012

(30) Foreign Application Priority Data

Dec. 24, 2009    (JP) .................................. 2009-292220

(51) Int. Cl.
*F16H 59/66* (2006.01)
(52) U.S. Cl.
USPC .................................. 477/44; 477/45; 474/18
(58) Field of Classification Search
USPC .................................. 477/45, 44; 474/18, 28
See application file for complete search history.

(56) References Cited

U.S. PATENT DOCUMENTS

| | | | | |
|---|---|---|---|---|
| 6,290,620 B1* | 9/2001 | Tsai et al. | ....................... | 474/18 |
| 6,547,692 B1* | 4/2003 | Ries-Mueller et al. | ......... | 477/45 |
| 6,634,982 B2* | 10/2003 | Miki et al. | ....................... | 477/45 |
| 7,739,019 B2* | 6/2010 | Robert et al. | .................... | 701/65 |
| 2004/0209732 A1 | 10/2004 | Eguchi et al. | | |
| 2005/0250606 A1* | 11/2005 | Shioiri et al. | ................... | 474/18 |
| 2007/0184936 A1 | 8/2007 | Nakayama | | |

FOREIGN PATENT DOCUMENTS

| | | | |
|---|---|---|---|
| JP | 61-092332 A | 5/1986 |
| JP | 62-028524 A | 2/1987 |
| JP | 63-046931 A | 2/1988 |
| JP | 07-063628 A | 3/1995 |
| JP | 2003-269591 A | 9/2003 |
| JP | 2004-232710 A | 8/2004 |
| JP | 2007-205529 A | 8/2007 |
| JP | 2008-286594 A | 11/2008 |

OTHER PUBLICATIONS

English translation of Official Communication issued in corresponding International Application PCT/JP2010/068677, mailed on Aug. 23, 2012.
Official Communication issued in International Patent Application No. PCT/JP2010/068677, mailed on Dec. 7, 2010.

* cited by examiner

*Primary Examiner* — Sherry Estremsky
(74) *Attorney, Agent, or Firm* — Keating & Bennett, LLP (57) ABSTRACT

A vehicle and a method for controlling the vehicle are capable of preventing slip of a belt of a continuously variable transmission at an appropriate timing. A control unit included in the vehicle includes a state information obtaining unit that obtains information indicating a state of a torque damping mechanism provided on a torque transmission path between a second pulley of a continuously variable transmission and a drive wheel, and a clamping force changing processing unit that changes the clamping forces of the first pulley of the continuously variable transmission and the second pulley, based on the state of the torque damping mechanism.

13 Claims, 8 Drawing Sheets

VEHICLE AND METHOD FOR CONTROLLING THE SAME

BACKGROUND OF THE INVENTION

1. Field of the Invention

The present invention relates to a vehicle and a method for controlling the vehicle, and more particularly, to control of a vehicle including a belt-type continuously variable transmission.

2. Description of the Related Art

Conventionally, a belt-type continuously variable transmission mounted on a vehicle such as a saddle-riding type vehicle includes one in which the interval between sheaves for sandwiching a belt is changed by an actuator. In a vehicle equipped with a belt-type continuously variable transmission, the belt may likely slip relative to the sheaves upon sudden torque fluctuation occurring at the drive wheel due to running on a bad conditioned road. Such slip of the belt is not preferable in view of durability of the belt and the sheaves.

According to a technique disclosed in Japanese Patent Laid-open Publication No. 2003-269591, in order to prevent slip of the belt, a force for clamping the belt with the sheaves (hereinafter referred to as a clamping force) is increased when the rotation speed of the drive wheel is changed. However, even though the actuator is activated after detection of change in the rotation speed of the drive wheel, torque fluctuation may likely have been transmitted to the continuously variable transmission by the increase of the clamping force.

Moreover, according to another technique disclosed in Japanese Patent Laid-open Publication No. 2003-269591, the clamping force is increased upon estimation, based on a value obtained in integration with an amount of change in the rotation speed of the drive wheel, to the effect that the road on which the vehicle is running is in a bad condition. However, as the clamping force is kept increasing even though the torque fluctuation occurring is relatively so small that slip of the belt will not be caused, torque transmission efficiency of the continuously variable transmission may be deteriorated.

SUMMARY OF THE INVENTION

In view of the above described situation, preferred embodiments of the present invention provide a vehicle and a method for controlling the vehicle to prevent slip of the belt of a continuously variable transmission at an appropriate timing.

A vehicle according to a preferred embodiment of the present invention includes an engine, a continuously variable transmission that receives a torque from the engine, a control device, a drive wheel that receives a torque from the continuously variable transmission, and a torque damping mechanism provided on a torque transmission path between the continuously variable transmission and the drive wheel. The continuously variable transmission includes a stationary sheave, a movable sheave provided opposite to and capable of moving relative to the stationary sheave, and an actuator that moves the movable sheave.

The control device drives the actuator to control a clamping force that is a force that clamps a belt with the stationary sheave and the movable sheave. The torque damping mechanism delays timing for transmission of torque fluctuation occurring at either one of an upstream torque transmission member positioned upstream of the torque damping mechanism and a downstream torque transmission member positioned downstream of the torque damping mechanism to the other of the upstream torque transmission member and the downstream torque transmission member. The control device includes a state information obtaining unit that obtains information indicating a state of the torque damping mechanism, and a clamping force changing processing unit that changes the clamping force, based on the state of the torque damping mechanism.

A method for controlling a vehicle according to another preferred embodiment of the present invention is a method for controlling a vehicle including an engine, a continuously variable transmission that receives a torque from the engine, a control device, a drive wheel that receives a torque from the continuously variable transmission, and a torque damping mechanism provided on a torque transmission path between the continuously variable transmission and the drive wheel. The continuously variable transmission includes a stationary sheave, a movable sheave provided opposite to and capable of moving relative to the stationary sheave, and an actuator for moving the movable sheave. The control device drives the actuator to control a clamping force that is a force that clamps a belt with the stationary sheave and the movable sheave. The torque damping mechanism delays timing for transmission of torque fluctuation occurring at either one of an upstream torque transmission member positioned upstream of the torque damping mechanism and a downstream torque transmission member positioned downstream of the torque damping mechanism to the other. According to the method for controlling a vehicle according to a preferred embodiment of the present invention, information indicating a state of the torque damping mechanism is obtained, and the clamping force is changed based on the state of the torque damping mechanism.

Note that the vehicle preferably is a saddle-riding type vehicle or other suitable vehicle, for example. A saddle-riding type vehicle is a vehicle in which a user bestrides the seat, including, e.g., a two-wheeled motor vehicle (scooter), a four-wheeled buggy, a snowmobile, and other similar vehicle. The vehicle may be a four-wheeled vehicle in which two or more users sits side by side in the vehicle width direction, for example.

According to various preferred embodiments of the present invention, as timing for transmission of torque fluctuation occurring at a drive wheel to the continuously variable transmission is delayed by a torque damping mechanism, it is possible to increase the clamping force by the time when the torque fluctuation is transmitted to the continuously variable transmission. Further, occurrence of torque fluctuation at a drive wheel can be detected based on the state of the torque damping mechanism, it is possible to increase or decrease the clamping force in accordance with a time for transmission of each torque fluctuation to the continuously variable transmission. For example, by increasing the clamping forces of each pair of the stationary sheave and the movable sheave in accordance with a time for transmission of torque fluctuation to the continuously variable transmission, it is possible to prevent slip of the belt.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A vehicle and a method for controlling the vehicle according to various preferred embodiments of the present invention will be described referring to the drawings.

Figure 1:
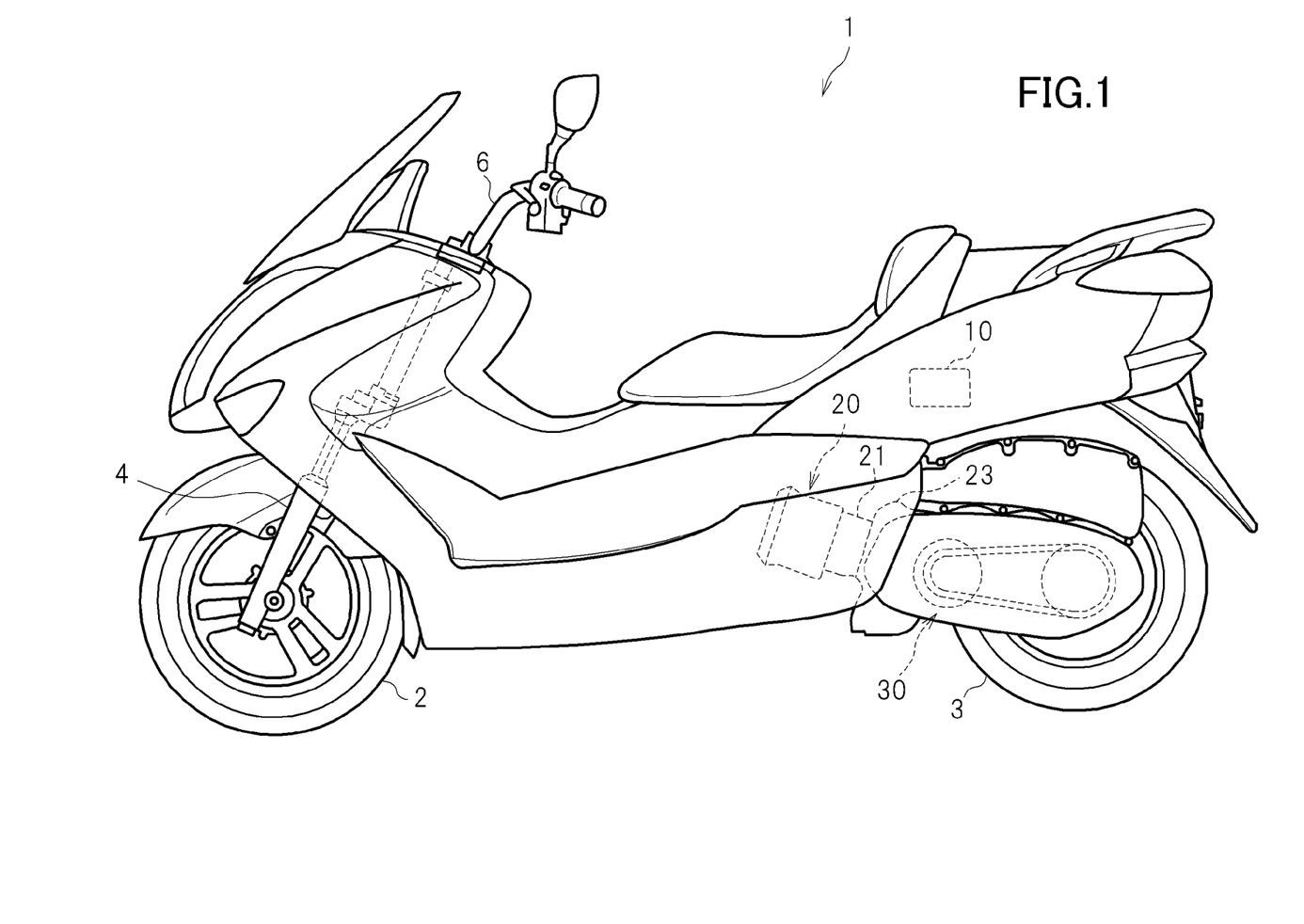
FIG. 1 is a side view of a vehicle according to a preferred embodiment of the present invention.

FIG. 1 is a side view of a two-wheeled motor vehicle 1 as a non-limiting example of a vehicle according to a preferred embodiment of the present invention. In the front portion of the two-wheeled motor vehicle 1, a front fork 4 is provided rotatably and inclined forward and downward. A front wheel 2 as a follower wheel is rotatably supported at the lower end of the front fork 4. A steering bar 6 extending in the left-right direction is provided to the upper end of the front fork 4. An accelerator grip (not shown) for operation by a driver is provided to the right end of the steering bar 6. An engine 20 is provided in the lower rear portion of the two-wheeled motor vehicle 1. The engine 20 includes a cylinder body 21 and a crank case 23. Rotation of the engine 20 is decelerated by the continuously variable transmission 30 and then transmitted to the rear wheel 3 that defines a drive wheel. Further, a control device 10 that is arranged and programmed to control the engine 20 and the continuously variable transmission 30 is provided above the engine 20.

Figure 2:
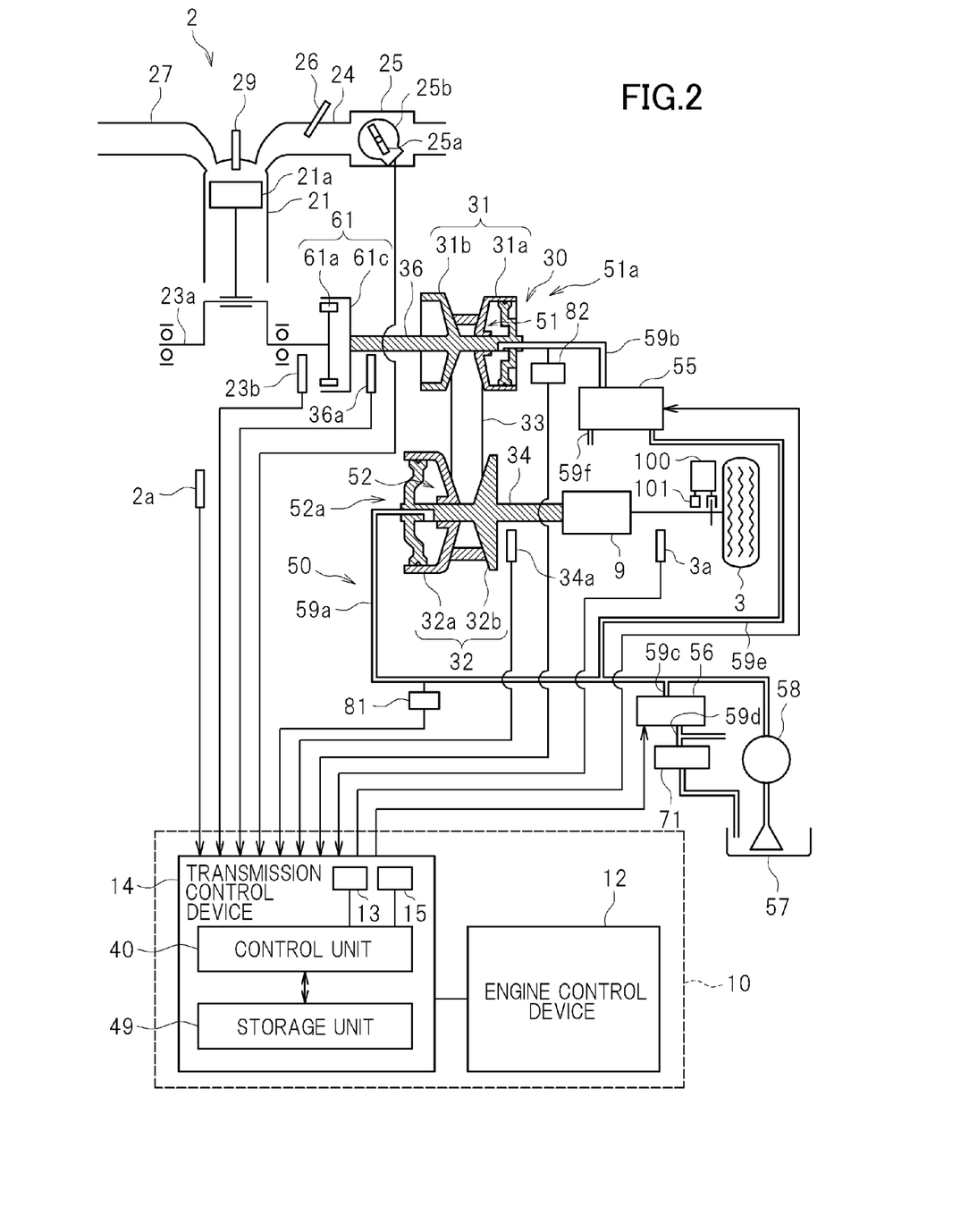
FIG. 2 schematically shows a torque transmission path and a hydraulic circuit included in the vehicle of FIG. 1.

FIG. 2 schematically shows a torque transmission path and a hydraulic circuit 50 included in the two-wheeled motor vehicle 1. On the torque transmission path extending from the engine 20 to the rear wheel 3, a clutch 61, the continuously variable transmission 30, and a cam damper 9 as a torque damping mechanism are provided.

An inlet pipe 24 and an exhaustion pipe 27 are connected to the cylinder body 21 of the engine 20. On the inlet pipe 24, a fuel supply device 26 that supplies fuel from a fuel tank (not shown) to the cylinder body 21 is provided. The fuel supply device 26 may be an electronically controlled fuel injection device subjected to control by the control device 10 or a carburetor, for example. Further, a throttle body 25 is connected to the inlet pipe 24. In the throttle body 25, a throttle valve 25a that adjusts the amount of air flowing into the inlet pipe 24 is provided. The throttle valve 25a may be an electronically controlled valve subjected to control by the control device 10 or a valve connected via a wire to the accelerator grip of the steering bar 6. The piston 21a provided inside the cylinder body 21 is linked to a crank shaft 23a. When the piston 21a reciprocates due to fuel being combusted, the crank shaft 23a is caused to rotate, as a result of which the engine 20 outputs torque.

The clutch 61 is provided between the engine 20 and the continuously variable transmission 30, that is, upstream of the continuously variable transmission 30 on the torque transmission path. The clutch 61 transmits a torque output from the engine 20 to the continuously variable transmission 30 or inhibits transmission of the torque to the continuously variable transmission 30. The clutch 61 preferably is a centrifugal clutch for automatic connection or disconnection depending on the rotation speed of the engine 20, for example. The clutch 61 includes a driving member 61a for integral rotation with the crank shaft 23a and a driven member 61c for integral rotation with a primary shaft 36 provided to the continuously variable transmission 30. The drive member 61a moves in the radial direction due to a centrifugal force to be brought into contact with the driven member 61c. The driven member 61c rotates integrally with the drive member 61a due to a friction force relative to the drive member 61a such that the torque of the engine 20 is transmitted via the clutch 61 to the primary shaft 36.

The continuously variable transmission 30 preferably is a belt-type continuously variable transmission, and includes a first pulley (primary pulley) 31 for integral rotation with the primary shaft 36, a second pulley (secondary pulley) 32 for integral rotation with the secondary shaft 34. Further, the continuously variable transmission 30 includes an annular belt 33 wound around the first pulley 31 and the second pulley 32 to transmit the rotation of the first pulley 31 to the second pulley 32. The belt 33 preferably is, e.g., a metallic belt or a resin belt. The first pulley 31 includes a first movable sheave (primary sliding sheave) 31a provided for movement in the axial direction of the primary shaft 36 and a first stationary sheave (primary fixed sheave) 31b provided opposite to the first movable sheave 31a in the axial direction. The second pulley 32 includes a second movable sheave (secondary sliding sheave) 32a provided for movement in the axial direction of the secondary shaft 34 and a second stationary sheave (secondary fixed sheave) 32b provided opposite to the second movable sheave 32a in the axial direction.

As the interval between the first movable sheave 31a and the first stationary sheave 31b and that between the second movable sheave 32a and the second stationary sheave 32b are changed, the reduction ratio of the continuously variable transmission 30 is changed. That is, when the first movable sheave 31a has moved to be closest to the first stationary sheave 31b and the second movable sheave 32a has moved to be farthest from the second stationary sheave 32b, the highest reduction ratio (the minimum reduction ratio) is obtained. Meanwhile, when the first movable sheave 31a has moved to be farthest from the first stationary sheave 31b and the second movable sheave 32a has moved to be closest to the second stationary sheave 32b, the lowest reduction ratio (the maximum reduction ratio) is obtained. The reduction ratio of the continuously variable transmission 30 changes between the highest and the lowest.

The continuously variable transmission 30 is a continuously variable transmission of which reduction ratio is controlled via hydraulic pressure, for example. A first hydraulic chamber (primary hydraulic chamber) 51 is provided to the first pulley 31, to which hydraulic oil is supplied from the second oil passage 59b, and the first movable sheave 31a moves in the axial direction according to the hydraulic pressure in the first hydraulic chamber 51. That is, a first hydraulic actuator 51a that generates a clamping force (first clamping force) to clamp the belt 33 by the first movable sheave 31a and the first stationary sheave 31b is provided to the first pulley 31. Meanwhile, a second hydraulic chamber (secondary hydraulic chamber) 52 is provided to the second pulley 32, to which hydraulic oil is supplied from the first oil passage 59a, and the second movable sheave 32a moves in the axial direction according to the hydraulic pressure in the second hydraulic chamber 52. That is, a second hydraulic second actuator 52a that generates a clamping force (second clamping force) that clamps the belt 22 by the second movable sheave 32a and the second stationary sheave 32b is provided to the second pulley 32.

A cam damper 9 is provided between the continuously variable transmission 30 and the rear wheel 3, that is, downstream of the continuously variable transmission 30 on the torque transmission path. The rotation having been transmitted from the first pulley 31 of the continuously variable transmission 30 to the second pulley 32 via the belt 22 is further transmitted from the secondary shaft 34 via the cam damper 9 to the axle of the rear wheel 3. The cam damper 9 is one example of a torque damping mechanism, and delays timing for transmission of torque fluctuation occurring either upstream or downstream of the cam damper 9 to the other.

When the two-wheeled motor vehicle 1 is running on a bad conditioned road or overcoming a step or when the rear wheel 3 is locked, or the like, such a sudden torque fluctuation with a negative angular acceleration may occur at the rear wheel 3. Such a torque fluctuation is referred to as a back torque, and occurrence of such a torque fluctuation is hardly predictable. A back torque occurring at the rear wheel 3 is transmitted via the cam damper 9 to the continuously variable transmission 30. In the above described situation, the back torque is damped by the cam damper 9, so that timing for transmission of the back torque to the continuously variable transmission 30 is delayed.

Figure 3:
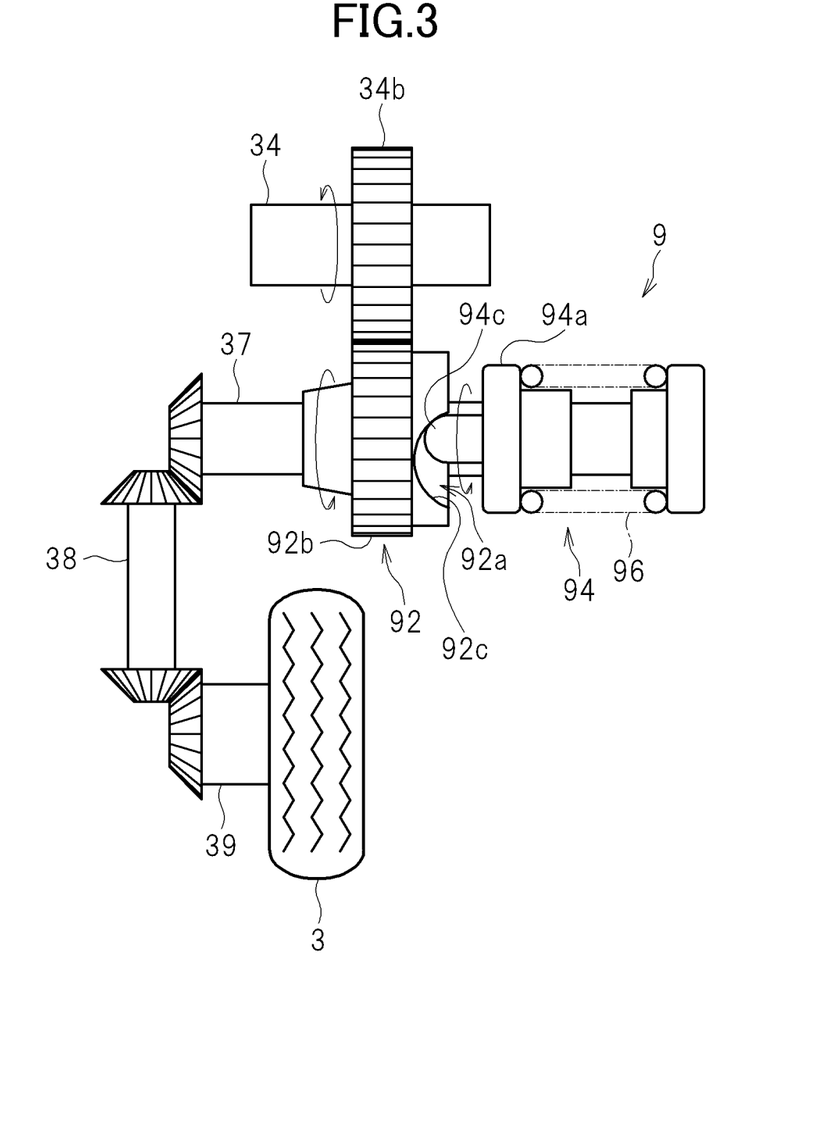
FIG. 3 schematically shows a cam damper included in the vehicle of FIG. 1.

Specifically, as shown in FIG. 3, the cam damper 9 includes a first shaft mounted member 92 that is mounted on an intermediate shaft 37, a second shaft mounted member 94, and an elastic member 96, such as a spring or the like, to urge the second shaft mounted member 94 toward the first shaft mounted member 92. The first shaft mounted member 92 is mounted for rotation relative to the intermediate shaft 37. A following gear 92b is mounted on the first shaft mounted member 92, and meshed with a drive gear 34b provided to the secondary shaft 34 extending from the continuously variable transmission 30. Thus, the first shaft mounted member 92 rotates integrally with the secondary shaft 34 as an upstream torque transmission member. The second shaft mounted member 94 is preferably spline-connected to the intermediate shaft 37 so as to move in the axial direction but be fixed in the circumferential direction. Thus, the second shaft mounted member 94 rotates integrally with the intermediate shaft 37 defining a downstream torque transmission member. Further, the drive shaft 38, linked to the intermediate shaft 37 via a bevel gear, and the axle 39 of the rear wheel 3, linked to the drive shaft 38 via a bevel gear, are also examples of the downstream torque transmission member.

On the side of the first shaft mounted member 92 that is opposite to the second shaft mounted member 94, a concave portion 92a is arranged to open toward the second shaft mounted member 94. On the bottom of the concave portion 92a, a cam surface 92c that is different in the depth at respective positions thereon in the circumferential direction is provided. Specifically, the cam surface 92c expands in the circumferential direction so as to get deeper as it extends toward the center of the circumferential direction. Meanwhile, on the side of the second shaft mounted member 94 that is opposite to the first shaft mounted member 92, a convex portion 94c is arranged to project toward the first shaft mounted member 92. The convex portion 94c has a semi-spherical tip end, and is inserted into the concave portion 92a located on the first shaft mounted member 92 and urged onto the cam surface 92c by the elastic member 96.

As the cam surface 92c of the first shaft mounted member 92 presses the convex portion 94c of the second shaft mounted member 94 in the circumferential direction when the first shaft mounted member 92 is driven by the secondary shaft 34 and thus rotates, the second shaft mounted member 94 as well is caused to rotate. With the above, the torque output from the continuously variable transmission 30 is transmitted via the secondary shaft 34, the cam camper 9, the intermediate shaft 37, the drive shaft 38, and the axle 39 to the rear wheel 3.

Note here that the position in the circumferential direction of the convex portion 94c in the concave portion 92a is automatically determined at a position where a force with which the cam surface 92c presses the convex portion 94c in the axial direction is balanced with a force with which the elastic member 96 presses the second shaft mounted member 94 in the axial direction. A force with which the cam surface 92c presses the convex portion 94c has a correspondence to the magnitude relation of the torque of the secondary shaft 34 and that of the intermediate shaft 37. Further, along with the above, the position in the axial direction of the second shaft mounted member 94 having the convex portion 94c as well is automatically determined. That is, the second shaft mounted member 94 is a displacement member that moves in the axial direction according to the relationship between the torque of the secondary shaft 34 and that of the intermediate shaft 37.

Figure 4:
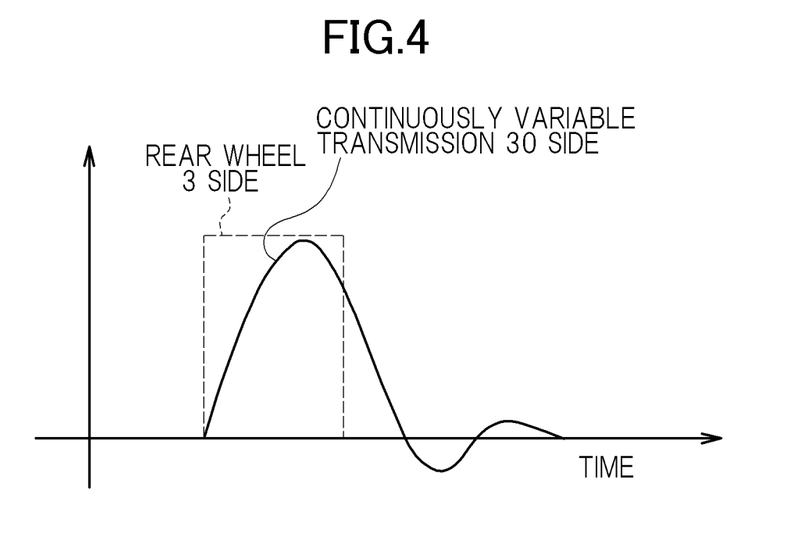
FIG. 4 explains torque fluctuation transmitted to the torque transmission path included in the vehicle of FIG. 1.

A back torque input from the rear wheel 3 and transmitted via the axle 39, the drive axis 38, and the intermediate shaft 37 to the cam damper 9 is damped by the action of the elastic member 96 included in the cam damper 9, so that the timing for transmission of the back torque to the continuously variable transmission 30 positioned upstream of the cam damper 9 is delayed. Specifically, as shown in FIG. 4, a back torque input into the rear wheel 3 presents a rectangular waveform that sharply rises, while a back torque transmitted to the continuously variable transmission 30 presents a waveform that gradually rises, which is due to an action of the elastic member 96 included in the cam damper 9.

Note that, as shown in FIG. 2, the two-wheeled motor vehicle 1 has a brake device 100 that applies brake control to the rear wheel 3. The brake device 100 includes a real wheel rotation sensor 101 provided in the vicinity of the axle of the rear wheel 3. The rear wheel rotation sensor 101 is a rotation detection unit that outputs a pulse signal having a frequency in accordance with the rotation speed of the rear wheel 3. The brake device 100 implements brake control, such as anti-lock brake system (ABS), or the like, by utilizing the rotation speed of the rear wheel 3, calculated based on a pulse signal from the rear wheel rotation sensor 101.

The hydraulic circuit 50 shown in FIG. 2 is a circuit that generates a hydraulic pressure in accordance with an electric signal input from the transmission control device 14 in the first hydraulic chamber 51 and the second hydraulic chamber 52. The hydraulic circuit 50 includes a transmission control valve 55 and a clamping force control valve 56. The transmission control valve 55 includes a solenoid valve that operates according to a current supplied from the transmission control device 14 and a pressure reducing valve that operates according to a signal pressure output from the solenoid valve. Further, the clamping force control valve 56 includes a solenoid valve that operates according to a current supplied from the transmission control device 14 and a relief valve that operates according to a signal pressure output from the solenoid valve.

The oil pump 58 is provided so as to operate following the rotation of the engine 20. Specifically, the oil pump 58 sucks hydraulic oil held in the oil sump 57, and supplies to the first oil passage 59a. The first oil passage 59a is connected to the second hydraulic chamber 52 and also to the clamping force control valve 56 via an oil passage 59c. An oil passage 59d connected to a lubrication path that lubricates the respective portions of the engine 20 and a lubrication path adjusting valve 71 that adjusts the hydraulic pressure in the lubrication path are connected to the clamping force control valve 56. The clamping force control valve 56 introduces hydraulic oil from the first oil passage 59a. The clamping force control valve 56 operates by adjusting the amount of hydraulic oil to be discharged into the oil passage 59d such that the hydraulic pressure (line pressure) of the first oil passage 59a and that of the second hydraulic chamber 52 become a hydraulic pressure in accordance with the current input from the transmission control device 14.

The transmission control valve 55 is connected to the first oil passage 59a via the oil passage 59e and also to the first hydraulic chamber 51 via the second oil passage 59b. Further, a discharge path 59f is connected to the transmission control valve 55. The transmission control valve 55 generates a hydraulic pressure in accordance with the current input from the transmission control device 14 in the first hydraulic chamber 51. That is, by supplying hydraulic oil introduced from the first oil passage 59a via the oil passage 59e to the second oil passage 59b and also discharging the hydraulic oil in the second oil passage 59b to the discharge path 59f, the transmission control valve 55 operates such that the hydraulic pressure in the first hydraulic chamber 51 corresponds to the current input from the transmission control device 14.

A throttle sensor 25b that determines the throttle opening is provided to the throttle body 25. The throttle sensor 25b is made using, e.g., a potentiometer, and outputs an electric signal in accordance with the throttle opening. An engine rotation speed sensor 23b that outputs a pulse signal having a frequency in accordance with the rotation speed of the crank shaft 23a is provided to the engine 20. A primary rotation speed sensor 36a that outputs a pulse signal having a frequency in accordance with the rotation speed of the primary shaft 36 and a secondary rotation speed sensor 34a that outputs a pulse signal having a frequency in accordance with the rotation speed of the secondary shaft 34 are provided to the continuously variable transmission 30. In the vicinity of the axle of the rear wheel 3, a rear wheel rotation sensor 3a as a rotation detection unit that outputs a pulse signal having a frequency in accordance with the rotation speed of the rear wheel 3 is provided. These engine rotation speed sensor 23b, primary rotation speed sensor 36a, secondary rotation speed sensor 34a, and rear wheel rotation sensor 3a preferably include, e.g., a rotation sensor including an electromagnetic pickup and a magnetoresistive element.

A hydraulic pressure sensor 81 including a diaphragm or a piezoelectric element that outputs an electric signal in accordance with the hydraulic pressure of the first oil passage 59a is provided to the first oil passage 59a. A hydraulic pressure sensor 82 similarly including a diaphragm or a piezo element that outputs an electric signal in accordance with the hydraulic pressure of the second oil passage 59b is provided to the second oil passage 59b.

The control device 10 includes a transmission control device 14 and valve drive circuits 13, 15. The transmission control device 14 includes a storage unit 49 made using a RAM (Random Access Memory) and a ROM (Read Only Memory) and a control unit 40 including a microprocessor that executes a program stored beforehand in the storage unit 49. In the storage unit 49, a map and a threshold for use in processing by the control unit 40 are stored in advance in addition to the program executed by the control unit 40.

Signals output from the engine rotation speed sensor 23b, the primary rotation speed sensor 36a, the secondary rotation speed sensor 34a, and the rear wheel rotation sensor 3a are input to the control unit 40. Based on these output signals, the control unit 40 calculates the engine rotation speed, the rotation speed of the primary shaft 36 (hereinafter referred to as a primary rotation speed), the rotation speed of the secondary shaft 34 (hereinafter referred to as a secondary rotation speed), and the rotation speed of the rear wheel 3. Further, the control unit 40 multiplies the rotation speed of the rear wheel 3 by the gear ratio between the intermediate shaft 37 and the axle 39 to thereby calculate the rotation speed of the intermediate shaft 37. Note that in calculation of the rotation speed of the intermediate shaft 37, the rotation speed of the rear wheel 3 calculated based on a pulse signal from the rear wheel rotation sensor 101 included in the brake device 100 may be used.

Further, signals output from the hydraulic pressure sensors 81, 82 and the throttle sensor 25b as well are input to the control unit 40. Based on these output signals, the control unit 40 determines the hydraulic pressure of the first hydraulic chamber 51 (hereinafter referred to as a primary pressure), the hydraulic pressure of the second hydraulic chamber 52 (hereinafter referred to as a secondary pressure), and the throttle opening. Based on these information items, the control unit 40 causes the transmission control valve 55 and the clamping force control valve 56 to operate to thereby control the continuously variable transmission 30. Control by the control unit 40 will be described later in detail. The respective sensors are connected to the control unit 40 via an interface circuit (not shown) including an A/D converter, or the like, and signals output from the respective sensors are converted in the interface circuit into signals that can be processed by the control unit 40.

The valve drive circuit 13 supplies a current in accordance with a signal input from the control unit 40 to the solenoid valve that constitutes the transmission control valve 55 to thereby activate the transmission control valve 55. Further, the valve drive circuit 15 supplies a current in accordance with a signal input from the control unit 40 to the solenoid valve that constitutes the clamping force control valve 56 to thereby activate the clamping force control valve 56.

Further, the control device 10 includes an engine control device 12 connected thereto via a bus. Signals output from the throttle sensor 25b, the engine rotation speed sensor 23b, and the like, are input also to the engine control device 12 via signal lines (not shown), and based on these output signals, the engine control device 12 controls ignition timing for an ignition plug 29 and the amount of fuel to be injected by the fuel supply device 26.

Figure 5:
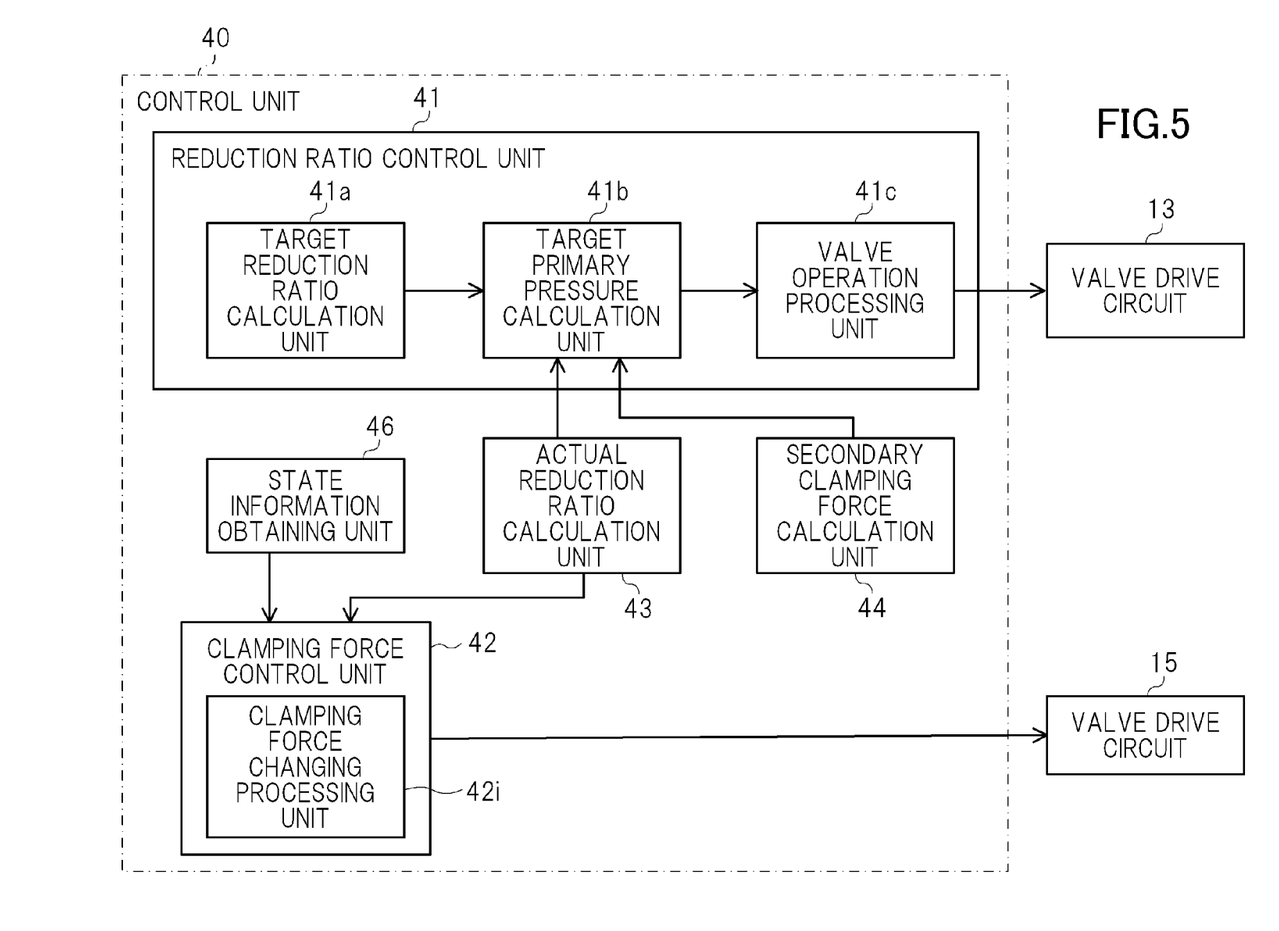
FIG. 5 is a functional block diagram of a control unit included in the vehicle of FIG. 1.

FIG. 5 is a block diagram showing a function of the control unit 40 of the transmission control device 14. As shown in the diagram, the control unit 40 includes, as functions thereof, a reduction ratio control unit 41 and a clamping force control unit 42. The reduction ratio control unit 41 activates the transmission control valve 55 to change the clamping force of the first pulley 31 relative to that of the second pulley 32 to thereby control the reduction ratio. The clamping force control unit 42 activates the clamping force control valve 56 to generate a hydraulic pressure free from slip of the belt 33 in the first oil passage 59a and the second hydraulic chamber 52. Further, the control unit 40 includes, as functions thereof, an actual reduction ratio calculation unit 43, a secondary clamping force calculation unit 44, and a state information obtaining unit 46.

The actual reduction ratio calculation unit 43 calculates the reduction ratio of the continuously variable transmission 30. The actual reduction ratio calculation unit 43 calculates the reduction ratio of the continuously variable transmission 30, based on the secondary rotation speed (hereinafter referred to as a secondary rotation speed Sspd) and a primary rotation speed (hereinafter referred to as an actual primary rotation speed Pspd).

The secondary clamping force calculation unit 44 calculates the clamping force of the second pulley 32 (hereinafter referred to as a secondary clamping force Fs). Note that the secondary clamping force Fs includes a clamping force generated according to the secondary pressure and a clamping force generated according to the centrifugal force of the hydraulic oil in the second hydraulic chamber 52. Thus, the secondary clamping force calculation unit 44 calculates the secondary clamping force Fs, based on, e.g., the hydraulic pressure detected by the hydraulic pressure sensor 81 (hereinafter referred to as an actual secondary pressure Ps) and the secondary rotation speed Sspd.

The state information obtaining unit 46 determines whether or not a back torque has been input into the rear wheel 3. A method for determining an occurrence of aback torque will be described later in detail. Upon determination that a back torque has been input into the rear wheel 3, the clamping force control unit 42 executes clamping force changing processing to be described later.

In the following, normal processing will be described. In normal processing, the clamping force control unit 42 controls the hydraulic pressure of the first oil passage 59a and that of the second hydraulic chamber 52, based on a torque output from the engine 20 (hereinafter referred to as an engine torque T) and a reduction ratio calculated by the actual reduction ratio calculation unit 43 (hereinafter referred to as an actual reduction ratio Rt). Processing by the clamping force control unit 42 is executed as follows, for example.

That is, initially, the clamping force control unit 42 calculates the engine torque T, based on the throttle opening (hereinafter referred to as a throttle opening Th) and the engine rotation speed (hereinafter referred to as an engine rotation speed Espd). Then, the clamping force control unit 42 calculates a target clamping force of the second pulley 32 (hereinafter referred to as a target secondary clamping force Fs-tg), based on the engine torque T and the actual reduction ratio Rt. For example, with reference to a map and a relational expression stored in the storage unit 49, the clamping force control unit 42 calculates a target secondary clamping force Fs-tg corresponding to the engine torque T and the actual reduction ratio Rt. Then, the clamping force control unit 42 calculates a target secondary pressure Ps-tg, based on the target secondary clamping force Fs-tg, calculated as described above. Further, the clamping force control unit 42 supplies a current from the valve drive circuit 15 to the solenoid of the clamping force control valve 56 such that the actual secondary pressure Ps becomes the same as the target secondary pressure Ps-tg. After activation of the transmission control device 14, the clamping force control unit 42 repetitively executes the above described processing for every predetermined cycle. As a result, the secondary pressure and the hydraulic pressure of the first oil passage 59a are gradually changed, based on a change in the throttle opening Th and the actual reduction ratio Rt.

In normal processing, the reduction ratio control unit 41 sets a target reduction ratio (hereinafter referred to as a target reduction ratio Rt-tg), based on a driving condition, such as the throttle opening Th, the secondary rotation speed Sspd, and so forth, and controls the reduction ratio such that the actual reduction ratio Rt becomes the same as the target reduction ratio Rt-tg. As shown in FIG. 5, the reduction ratio control unit 41 includes a target reduction ratio calculation unit 41a, a target primary pressure calculation unit 41b, and a valve operation processing unit 41c.

The target reduction ratio calculation unit 41a calculates a target reduction ratio Rt-tg, based on the throttle opening Th, the secondary rotation speed Sspd, and a vehicle speed obtained based on the rotation speed of the rear wheel 3 (hereinafter referred to as a vehicle speed V). For example, with reference to a map that correlates a throttle opening, a vehicle speed, and a primary rotation speed (hereinafter referred to as a transmission control map) and a relational expression, the target reduction ratio calculation unit 41a calculates a target primary rotation speed Pspd-tg correlated to the throttle opening Th and the vehicle speed V. Thereafter, the target reduction ratio calculation unit 41a divides the target primary rotation speed Pspd-tg by the secondary rotation speed Sspd to thereby calculate the target reduction ratio Rt-tg.

The target primary pressure calculation unit 41b calculates a target primary pressure (hereinafter referred to as a target primary pressure Pp-tg), based on the actual reduction ratio Rt and the target reduction ratio Rt-tg. This processing by the target primary pressure calculation unit 41b is executed as follows, for example.

That is, initially, the target primary pressure calculation unit 41b calculates a speed by which to change the reduction ratio (hereinafter referred to as a transmission speed Drt), based on the difference between the actual reduction ratio Rt and the target reduction ratio Rt-tg. For example, with reference to a map that correlates the difference between an actual reduction ratio and a target reduction ratio and a transmission speed (hereinafter referred to as a transmission speed map) and a relational expression, the target primary pressure calculation unit 41b calculates a transmission speed Drt correlated to the difference between the actual reduction ratio Rt calculated by the actual reduction ratio calculation unit 43 and the target reduction ratio Rt-tg calculated by the target reduction ratio calculation unit 41a. Then, the target primary pressure calculation unit 41b adds or subtracts a force in accordance with the transmission speed Drt to or from the clamping force of the first pulley 31 necessary to maintain the current reduction ratio to determine the obtained value as the target clamping force of the first pulley 31 (hereinafter referred to as a target primary clamping force Fp-tg).

For example, the target primary pressure calculation unit 41b calculates the target primary clamping force Fp-tg, using the expression (1) below:

$$Fp\text{-}tg = Fpk - Drt/k \cdot Pspd \tag{1}$$

wherein Fpk is a clamping force of the first pulley 31 necessary to maintain the current reduction ratio, being, e.g., a product (Fs×Rf) of the ratio between the clamping force of the second pulley 32 described above and that of the first pulley 31 (hereinafter referred to as a thrust force ratio Rf).

With reference to the map and the relational expression, the target primary pressure calculation unit 41b calculates a thrust force ratio Rf corresponding to the actual reduction ratio Rt, calculated by the actual reduction ratio calculation unit 43, then calculates the target primary clamping force Fp-tg, based on the thrust force ratio Rf and the secondary clamping force Fs, that is, a clamping force calculated by the secondary clamping force calculation unit 44. Alternatively, while k indicates a coefficient determined based on the reduction ratio and the primary rotation speed, the target primary pressure calculation unit 41b calculates a coefficient k correlated to the actual reduction ratio Rt and the actual primary rotation speed Pspd, with reference to the map, wherein Pspd is an actual primary rotation speed determined by the primary rotation speed sensor 36a, as described above.

The target primary pressure calculation unit 41b calculates the target primary pressure Pp-tg, based on the target primary clamping force Fp-tg, calculated as described above. For example, because the clamping force of the first pulley 31 includes a centrifugal force generated through rotation of the hydraulic oil in the first hydraulic chamber 51, the target primary pressure calculation unit 41b calculates the target primary pressure Pp-tg, based on the actual primary rotation speed Pspd and the pressure receiving area of the first pulley 31 (the area of a portion of the first movable sheave 31a that receives the hydraulic pressure).

The valve operation processing unit 41c controls a current to be supplied from the valve drive circuit 13 to the transmission control valve 55 such that the hydraulic pressure of the first hydraulic chamber 51, determined by the hydraulic pressure sensor 82 (hereinafter referred to as an actual primary pressure Pp), becomes the same as the target primary pressure Pp-tg. Specifically, the valve operation processing unit 41c calculates an instruction value, based on the difference between the target primary pressure Pp-tg and the actual primary pressure Pp, and outputs the instruction value to the valve drive circuit 13. The valve drive circuit 13 supplies a current of a value in accordance with the instruction value to the transmission control valve 55. As a result of this processing by the valve operation processing unit 41c, the difference between the target primary pressure Pp-tg and the actual primary pressure Pp is solved, and the actual reduction ratio Rt becomes closer to the target reduction ratio Rt-tg.

During transmission, the target primary pressure calculation unit 41b repetitively executes the above described processing to thereby sequentially update the target primary pressure Pp-tg. That is, every change of the actual reduction ratio Rt toward the target reduction ratio Rt-tg, the target primary pressure calculation unit 41b newly calculates a target primary pressure Pp-tg, based on the difference between the changed actual reduction ratio Rt and the target reduction ratio Rt-tg. The valve operation processing unit 41c outputs an instruction value calculated based on the newly calculated target primary pressure Pp-tg and the actual primary pressure Pp to the valve drive circuit 13. As a result, the actual reduction ratio Rt becomes even closer to the target reduction ratio Rt-tg. When the difference between the actual reduction ratio Rt and the target reduction ratio Rt-tg is resolved, the transmission speed Drt calculated based on the difference between the actual reduction ratio Rt and the target reduction ratio Rt-tg becomes 0. As a result, the target primary pressure calculation unit 41b calculates a hydraulic pressure corresponding to the clamping force Fpk of the first pulley 31 necessary to maintain the actual reduction ratio Rt according to the target primary pressure Pp-tg. As a result, the actual reduction ratio Rt is maintained at the target reduction ratio Rt-tg.

Figure 6:
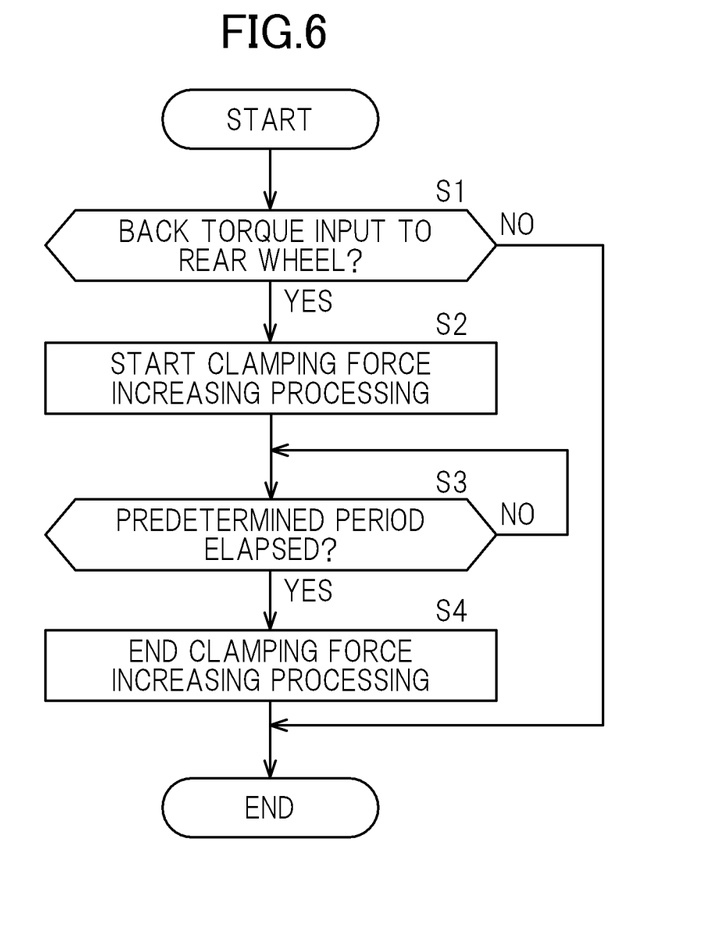
FIG. 6 is a flowchart of an example operation of the control unit included in the vehicle of FIG. 1.

In the following, clamping force changing processing will be described. When a back torque occurs at the rear wheel 3, the back torque is transmitted to the continuously variable transmission 30, as a result of which the belt 33 may slip relative to the first pulley 31 and the second pulley 32. In view of the above, when a back torque occurs at the rear wheel 3, the clamping force changing processing unit 42i of the clamping force control unit 42 executes clamping force changing processing to increase the clamping force of the second pulley 32 to thereby prevent slip of the belt 33. FIG. 6 is a flowchart of an example processing executed by the control unit 40.

That is, initially, the state information obtaining unit 46 obtains information on a state of the cam damper 9, and determines whether or not a back torque has been input into the rear wheel 3 (S1). According to a first example method for detecting an occurrence of a back torque, whether or not a back torque has been input into the rear wheel 3 is determined based on whether or not a difference equal to or larger than a predetermined difference is caused between the rotation speed of the secondary shaft 34 and that of the intermediate shaft 37, shown in FIG. 3. That is, when a back torque is input into the rear wheel 3, in the cam damper 9, the position in the circumferential direction of the convex portion 94c of the second shaft mounted member 94 inserted in the concave portion 92a of the first shaft mounted member 92 is displaced, which causes a difference in the rotation speed between the secondary shaft 34 and the intermediate shaft 37. Thus, in this example, when a difference equal to or larger than a predetermined difference is caused in the rotation speed between the secondary shaft 34 and the intermediate shaft 37, it is determined that a back torque has been input into the rear wheel 3. Specifically, when the rotation speed of the intermediate shaft 37 has decreased, it is determined that a back torque has been input into the rear wheel 3.

According to a second example method for detecting an occurrence of a back torque, whether or not a back torque has been input into the rear wheel 3 is determined based on whether or not a phase difference equal to or larger than a predetermined phase difference is caused between the rotation of the secondary shaft 34 and that of the intermediate shaft 37, shown in FIG. 3. That is, when a back torque is input into the rear wheel 3, in the cam damper 9, the position in the circumferential direction of the convex portion 94c of the second shaft mounted member 94 inserted in the concave portion 92a of the first shaft mounted member 92 is displaced, which causes a phase difference between the rotation of the secondary shaft 34 and that of the intermediate shaft 37. Thus, in this example, when a phase difference equal to or larger than a predetermined phase difference is caused between the rotation of the secondary shaft 34 and that of the intermediate shaft 37, it is determined that a back torque has been input into the rear wheel 3. Specifically, when the phase of the rotation of the intermediate shaft 37 is delayed relative to that of the secondary shaft 34, it is determined that a back torque has been input into the rear wheel 3. Such a phase difference is determined by monitoring a displacement between a pulse signal from the secondary rotation speed sensor 34a and that from the rear wheel rotation sensor 3a, as shown in FIG. 2.

Figure 7:
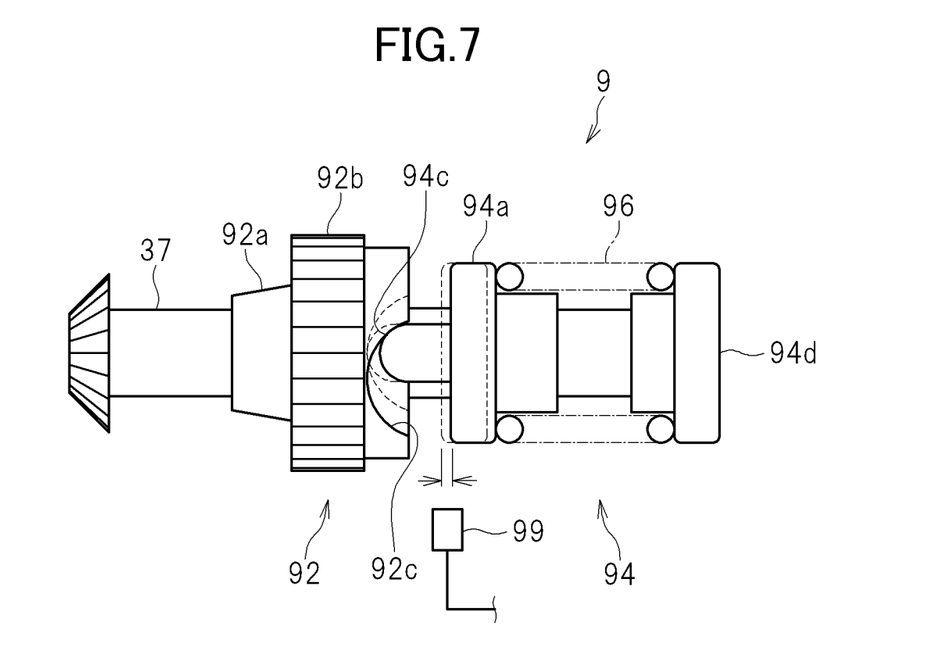
FIG. 7 explains a modified example of a vehicle according to a preferred embodiment of the present invention.

According to a third example method for detecting an occurrence of a back torque, whether or not a back torque has been input into the rear wheel 3 is determined based on whether or not the second shaft mounted member 94 included in the cam damper 9, shown in FIG. 3, is displaced in the axial direction by an amount equal to or larger than a predetermined amount. That is, when aback torque is input into the rear wheel 3, in the cam damper 9, a relationship between a force with which the cam surface 92c presses the convex portion 94c in the axial direction and a force with which the elastic member 96 presses the second shaft mounted member 94 in the axial direction is changed, which causes the second shaft mounted member 94 to move in the axial direction. Thus, as shown in FIG. 7, in this example, a displacement sensor 99 that determines the position in the axial direction of the second shaft mounted member 94 is provided so that whether or not a back torque has been input into the rear wheel 3 is determined based on a displacement of the second shaft mounted member 94 in the axial direction. Specifically, when the second shaft mounted member 94 moves in a direction departing from the first shaft mounted member 92, that is, when the second shaft mounted member 94 moves in the direction opposite from the direction in which the second shaft mounted member 94 presses the elastic member 96, it is determined that a back torque has been input into the rear wheel 3.

Thereafter, upon determination that a back torque has been input into the rear wheel 3 (S1: YES), the clamping force changing processing unit 42*i* of the clamping force control unit 42 starts clamping force changing processing to increase the clamping force of the second pulley 32 (S2). Then, after elapse of a predetermined period of time after the start of the clamping force changing processing (S3: YES), the clamping force changing processing unit 42*i* ends the clamping force changing processing (S4).

The clamping force changing processing unit 42*i* adds a positive value to the target secondary pressure Ps-tg calculated as is in the normal processing described above, to thereby correct the target secondary pressure Ps-tg (hereinafter referred to as a corrected target secondary pressure Ps-tg#). Then, the clamping force control unit 42 supplies a current from the valve drive circuit 15 to the solenoid of the clamping force control valve 56 such that the actual secondary pressure Ps becomes the same as the corrected target secondary pressure Ps-tg#. With the above, the clamping force of the second pulley 32 increases more than in the normal processing. Note that although a positive value is preferably added to the target secondary pressure Ps-tg in this preferred embodiment, this is not limiting, and a positive value may be added to the target secondary clamping force Fs-tg. Also note that, as described above, in the reduction ratio control unit 41, the target primary pressure calculation unit 41*b* calculates the target primary clamping force Fp-tg and the target primary pressure Pp-tg, based on the secondary clamping force Fs calculated by the secondary clamping force calculation unit 44. Thus, the clamping force of the first pulley 31 as well increases more than in the normal processing along with the increase of the clamping force of the second pulley 32. In this manner, as the clamping forces of the first pulley 31 and the second pulley 32 both increase, slip of the belt 33 can be prevented.

In this clamping force changing processing, the clamping force changing processing unit 42*i* increases the clamping forces of the first pulley 31 and the second pulley 32 such that the torque capacity of the continuously variable transmission 30 satisfies a predetermined condition. Note that the torque capacity of the continuously variable transmission 30 is the maximum value of a torque which the continuously variable transmission 30 can transmit, and application of a torque in excess of the torque capacity causes slip of the belt 33. The torque capacity of the continuously variable transmission 30 and the clamping forces of the first pulley 31 and the second pulley 32 have a linear relationship determined beforehand. As a value to be added to the target secondary pressure Ps-tg, the clamping force changing processing unit 42*i* uses a value for the continuously variable transmission 30 to satisfy a predetermined condition. A value to be added to the target secondary pressure Ps-tg may be a predetermined constant value or, in the case where a condition to be satisfied by the torque capacity of the continuously variable transmission 30 is changeable, may be determined upon every change of the condition.

Specifically, the clamping force changing processing unit 42*i* increases the clamping forces of the first pulley 31 and the second pulley 32 such that the torque capacity of the continuously variable transmission 30 becomes higher than that of the clutch 61. The torque capacity of the clutch 61 preferably defined by a centrifugal clutch will change according to the engine rotation speed. Thus, the clamping force changing processing unit 42*i* determines a value to be added to the target secondary pressure Ps-tg such that the torque capacity of the continuously variable transmission 30 becomes slightly higher than the torque capacity of the clutch 61 that is estimated based on the engine rotation speed. With the above, the clutch 61 is disconnected before the belt 33 of the continuously variable transmission 30 slips, so that no torque can be transmitted any longer.

Further, the clamping force changing processing unit 42*i* may increase the clamping forces of the first pulley 31 and the second pulley 32 such that the torque capacity of the continuously variable transmission 30 becomes higher than that of the cam damper 9. The torque capacity of the cam damper 9 is a torque at a time when the convex portion 94*c* of the second shaft mounted member 94, shown in FIG. 3, escapes from the concave portion 92*a* of the first shaft mounted member 92. The clamping force changing processing unit 42*i* determines a value to be added to the target secondary pressure Ps-tg such that the torque capacity of the continuously variable transmission 30 becomes higher than the torque capacity of the cam damper 9. With the above, the convex portion 94*c* escapes from the concave portion 92*a* before the belt 33 of the continuously variable transmission 30 slips, so that no torque can be transmitted any longer.

Figure 8:
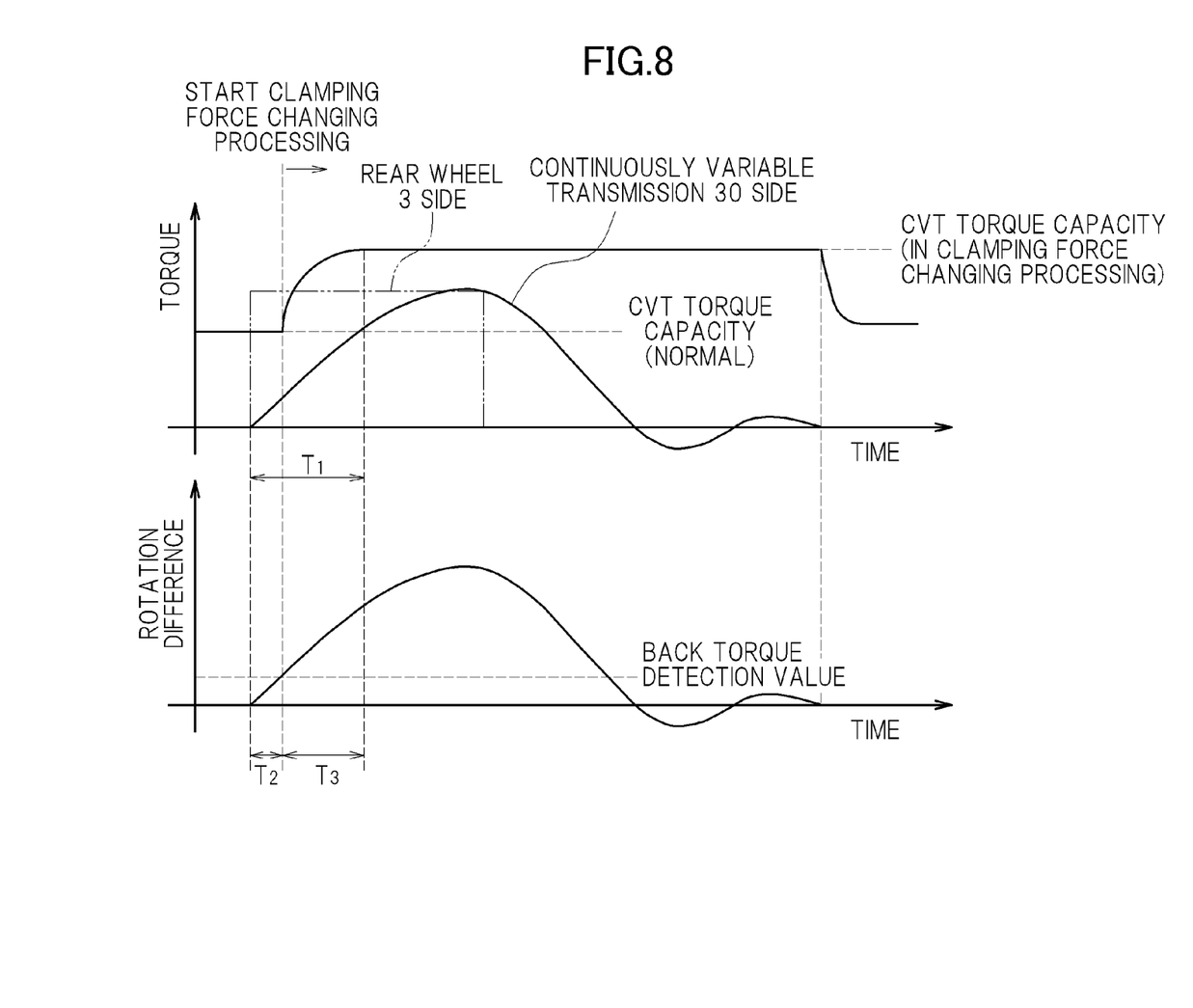
FIG. 8 explains timing for a clamping force changing processing that is executed in the vehicle.

FIG. 8 explains timing for executing the clamping force changing processing. In the upper graph in the diagram, there are shown a back torque input into the rear wheel 3, a back torque transmitted via the cam damper 9 to the continuously variable transmission 30, and the torque capacity of the continuously variable transmission 30 (CVT torque capacity), while, in the lower graph, there is shown a difference in the rotation speed between the secondary shaft 34 and the intermediate shaft 37 at a time when a back torque is input into the rear wheel 3. As shown in these graphs, change as time passes in the difference in the rotation speed between the secondary shaft 34 and the intermediate shaft 37 corresponds to a change as time passes in a back torque transmitted via the cam damper 9 to the continuously variable transmission 30.

Time T1 indicates a period of time elapsed until the magnitude of a back torque transmitted to the continuously variable transmission 30 becomes the same as the torque capacity of the continuously variable transmission 30 in the normal processing after the back torque is input into the rear wheel 3. Time T2 indicates a period of time elapsed after input of a back torque into the rear wheel 3 until detection of back torque occurrence. Time T3 indicates a period of time elapsed after start of the clamping force changing processing until completion of increase of the torque capacity of the continuously variable transmission 30.

Specifically, it is preferable that an increase of the torque capacity of the continuously variable transmission 30 is completed before the magnitude of a back torque transmitted to the continuously variable transmission 30 becomes the same as the torque capacity of the continuously variable transmission 30 in the normal processing after the back torque is input into the rear wheel 3 (time T1). Therefore, in order to ensure a period of time until completion of the increase of the torque capacity of the continuously variable transmission 30 (time T3), it is preferable to reduce the period of time until detection of back torque occurrence (T2). Specifically, a back torque detection value is set such that time T2 has a value equal to or smaller than a value obtained by subtracting time T3 from time T1.

In this preferred embodiment described above, as the cam damper 9 that delays timing for transmission of a back torque input into the rear wheel 3 to the continuously variable transmission 30 is used, it is possible to increase the clamping forces of the first pulley 31 and the second pulley 32 by the time when a back torque is transmitted to the continuously variable transmission 30. Further, as input of a back torque is detected based on the state of the cam damper 9, it is possible to increase or decrease the clamping forces of the first pulley 31 and the second pulley 32 in accordance with a time for transmission of a back torque to the continuously variable transmission 30.

Further, according to the first example method for detecting an occurrence of a back torque, whether or not a back torque has been input into the rear wheel 3 is determined based on whether or not a difference equal to or larger than a predetermined difference is caused between the rotation speed of the secondary shaft 34 and that of the intermediate shaft 37, shown in FIG. 3. This enables detection of a displacement in the circumferential direction of the convex portion 94c of the second shaft mounted member 94 inserted in the concave portion 92a of the first shaft mounted member 92.

Further, according to the second example method for detecting an occurrence of a back torque, whether or not a back torque has been input into the rear wheel 3 is determined based on whether or not a phase difference equal to or larger than a predetermined phase difference is caused between the rotation of the secondary shaft 34 and that of the intermediate shaft 37, shown in FIG. 3. This enables detection of a displacement in the circumferential direction of the convex portion 94c of the second shaft mounted member 94 inserted in the concave portion 92a of the first shaft mounted member 92.

Further, according to the third example method for detecting an occurrence of a back torque, whether or not a back torque has been input into the rear wheel 3 is determined based on whether or not the second shaft mounted member 94 included in the cam damper 9 shown in FIG. 3 has been moved in the axial direction by an amount larger than a predetermined amount. This enables detection of a displacement in the axial direction of the second shaft mounted member 94.

Further, in the present preferred embodiment, the rotation speed of the intermediate shaft 37, which is used in determination as to whether or not a back torque has been input into the rear wheel 3, is calculated based on a signal output from the rear wheel rotation sensor 3a to determine the rotation speed of the rear wheel 3. As such a rear wheel rotation sensor 3a is generally equipped to the two-wheeled motor vehicle 1, use of the rotation speed of the rear wheel 3 obtained from a signal output from the rear wheel rotation sensor 3a eliminates the need of separate provision of a sensor to determine the rotation speed of the intermediate shaft 37.

Further, the rotation speed of the intermediate shaft 37, which is used to determine whether or not a back torque has been input into the rear wheel 3, may be calculated based on a signal output from the rear wheel rotation sensor 101 included in the brake device 100. As such a rear wheel rotation sensor 101 is generally equipped to the brake device 100 to implement the ABS, use of the rotation speed of the rear wheel 3 obtained from a signal output from the rear wheel rotation sensor 101 eliminates the need of separate provision of a sensor to determine the rotation speed of the intermediate shaft 37.

Further, in the present preferred embodiment, the clamping force changing processing unit 42i increases the clamping forces of the first pulley 31 and the second pulley 32 such that the torque capacity of the continuously variable transmission 30 becomes higher than the torque capacity of the clutch 61. With the above, as the clutch 61 is disconnected before an occurrence of a slip of the belt 33 of the continuously variable transmission 30, slip of the belt 33 can be prevented. Further, setting the torque capacity of the continuously variable transmission 30 slightly higher than the torque capacity of the clutch 61 eliminates the need for an excessive increase of the clamping forces of the first pulley 31 and the second pulley 32.

Further, in the present preferred embodiment, the clamping force changing processing unit 42i increases the clamping forces of the first pulley 31 and the second pulley 32 such that the torque capacity of the continuously variable transmission 30 becomes higher than the torque capacity of the cam damper 9. With the above, as the convex portion 94c escapes from the concave portion 92a before an occurrence of a slip of the belt 33 of the continuously variable transmission 30, slip of the belt 33 can be prevented. Still further, setting the torque capacity of the continuously variable transmission 30 higher than the torque capacity of the cam damper 9 can cause the cam damper 9 to function as a fuse upon the occurrence of an excessively large torque.

Further, in the present preferred embodiment, the clutch 61 preferably defined by a centrifugal clutch, for example, is used. This enables a simpler and smaller device structure in the size, compared to a technique utilizing an electronically-controlled clutch to prevent back torque transmission.

Note that, according to the present preferred embodiment, as slip of the belt 33 of the continuously variable transmission 30 is prevented at an appropriate timing, use of a metallic belt as the belt 33 is particularly preferable.

Note that although a preferred embodiment of the present invention has been described above, the present invention is not limited to the above described preferred embodiment, and various modified preferred embodiments are possible for a person skilled in the art.

That is, although hydraulic actuators are preferably used as the first actuator 51a and the second actuator 52b to change the transmission gear ratio of the continuously variable transmission 30 in the above preferred embodiment, this is not limiting, and an actuator, such as a motor, may be also be used, for example.

Further, although the elastic member 96 defined by a coil spring preferably is used as the cam damper 9, this is not limiting, and a cam damper including a conical spring may be used, for example. Further, a cam damper is not limiting, and any torque interfering mechanism that delays timing for transmission of a back torque input into the rear wheel 3 to the continuously variable transmission 30 by an action of an elastic member is applicable.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
an engine;
a continuously variable transmission that receives a torque from the engine, the continuously variable transmission including a stationary sheave, a movable sheave provided opposite to and capable of moving relative to the stationary sheave, and an actuator that moves the movable sheave;
a control device arranged and programmed to drive the actuator to control a clamping force that is a force to clamp a belt with the stationary sheave and the movable sheave;
a drive wheel that receives a torque from the continuously variable transmission; and
a torque damping mechanism provided on a torque transmission path between the continuously variable transmission and the drive wheel, to delay timing of transmission of torque fluctuation with a negative angular acceleration occurring at a downstream torque transmission member positioned downstream of the torque damping mechanism to an upstream torque transmission member positioned upstream of the torque damping mechanism, in which a rotation direction of the downstream torque transmission member is defined as positive; wherein the control device includes:
- a state information obtaining unit that obtains information indicating a state of the torque damping mechanism; and
- a clamping force changing processing unit that changes the clamping force based on the state of the torque damping mechanism.

2. The vehicle according to claim 1, wherein the clamping force changing processing unit increases the clamping force when torque fluctuation occurs at the downstream torque transmission member.

3. The vehicle according to claim 1, wherein the state information obtaining unit obtains information on rotation of the upstream torque transmission member and information on rotation of the downstream torque transmission member as the information indicating a state of the torque damping mechanism; and the clamping force changing processing unit increases the clamping force when a phase difference equal to or larger than a predetermined phase difference is caused between the rotation of the upstream torque transmission member and the rotation of the downstream torque transmission member.

4. The vehicle according to claim 3, further comprising:
- a brake device that includes a rotation detection unit that detects rotation of the drive wheel and brakes the drive wheel based on a rotation speed of the drive wheel; wherein the state information obtaining unit obtains the information on the rotation of the downstream torque transmission member from the rotation detection unit.

5. The vehicle according to claim 3, wherein the state information obtaining unit obtains the information on the rotation of the downstream torque transmission member from a rotation detection unit that detects rotation of the drive wheel.

6. The vehicle according to claim 1, wherein the state information obtaining unit obtains information on rotation of the upstream torque transmission member and information on rotation of the downstream torque transmission member as the information indicating a state of the torque damping mechanism; and the clamping force changing processing unit increases the clamping force when a difference equal to or larger than a predetermined difference is caused between a rotation speed of the upstream torque transmission member and a rotation speed of the downstream torque transmission member.

7. The vehicle according to claim 1, wherein the state information obtaining unit obtains position information on a displacement member in the torque damping mechanism that moves according to a relationship between a torque of the upstream torque transmission member and a torque of the downstream torque transmission member as the information indicating a state of the torque damping mechanism, and the clamping force changing processing unit changes the clamping force based on a position of the displacement member.

8. The vehicle according to claim 1, further comprising a clutch provided in the torque transmission path, wherein the clamping force changing processing unit increases the clamping force such that a torque capacity of the continuously variable transmission becomes higher than a torque capacity of the clutch.

9. The vehicle according to claim 1, wherein the clamping force changing processing unit increases the clamping force such that a torque capacity of the continuously variable transmission becomes higher than a torque capacity of the torque damping mechanism.

10. The vehicle according to claim 1, wherein the torque damping mechanism is a cam damper including:
- a first member linked to the upstream torque transmission member;
- a second member linked to the downstream torque transmission member; and
- an elastic member that urges a convex portion located on either one of the first member and the second member toward a cam surface in a concave portion located on the other of the first member and the second member.

11. The vehicle according to claim 1, further comprising a centrifugal clutch provided in the torque transmission path.

12. The vehicle according to claim 1, wherein the belt of the continuously variable transmission is a metallic belt.

13. A method for controlling a vehicle including an engine, a continuously variable transmission that receives a torque from the engine and includes a stationary sheave, a movable sheave provided opposite to and capable of moving relative to the stationary sheave, and an actuator that moves the movable sheave, a control device arranged and programmed to drive the actuator to control a clamping force that is a force to clamp a belt with the stationary sheave and the movable sheave, a drive wheel that receives a torque from the continuously variable transmission, and a torque damping mechanism provided on a torque transmission path between the continuously variable transmission and the drive wheel, to delay timing of transmission of torque fluctuation with a negative angular acceleration occurring at a downstream torque transmission member positioned downstream of the torque damping mechanism to an upstream torque transmission member positioned upstream of the torque damping mechanism, in which a rotation direction of the downstream torque transmission member is defined as positive, the method comprising the steps of:
- obtaining information indicating a state of the torque damping mechanism; and changing the clamping force based on the state of the torque damping mechanism.

* * * * *